June 8, 1943.  C. S. ROSSON  2,321,321
CARTRIDGE SHELL CRIMPER
Filed Sept. 13, 1941
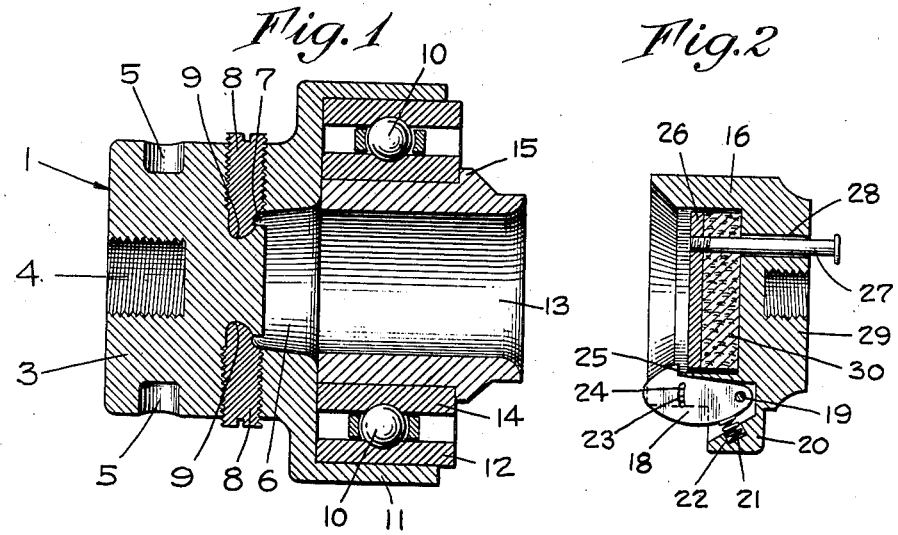
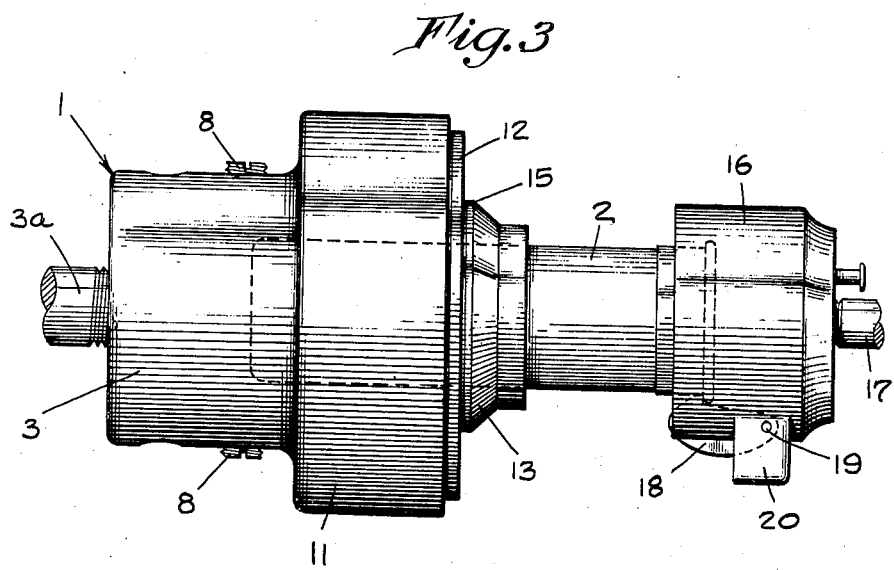
INVENTOR
CHARLES STANLEY ROSSON
BY
ATTORNEYS Patented June 8, 1943

2,321,321

UNITED STATES PATENT OFFICE 2,321,321

CARTRIDGE SHELL CRIMPER

Charles Stanley Rosson, Norwich, England, assignor to Imperial Chemical Industries Limited, a corporation of Great Britain Application September 13, 1941, Serial No. 410,736
In Great Britain November 27, 1940

3 Claims. (Cl. 86—39)

This invention relates to the manufacture of shotgun cartridges in which the tubular portion is made of paper or other suitable non-metallic material, and more particularly to improved means for sealing such cartridges.

It is already well known to seal such cartridges by means of an overshot card closure formed by placing a disc of suitable materials over the charge of shot and then turning over the mouth of the cartridge case, thus forming a flange or beading which serves to secure the disc in position. The closing operation is usually effected by inserting the mouth of the cartridge in the central bore of a rotary tool or chuck which bore is provided with a plunger and transverse pins, the said pins progressively flexing the mouth of the cartridge inwards and forming a flange or beading thereon, which flange or beading is then compressed between the plunger and the peripheral wall of the chuck. The cartridge is a sliding fit within the bore of the chuck and remains stationary relatively to the rotary chuck during the closing operation. In order to reduce friction between the cartridge and the chuck, the depth of the bore is such that only a sufficient length of the cartridge is enclosed thereby to allow the turning-over operation to be effected. Under the certain circumstances, the axial pressure exerted on the cartridge during the closing operation tends to cause distortion or deformation of that portion of the cartridge tube external to the chuck, as for example when the cartridge is loaded with the large sizes of shot, local bulges may be produced in the walls of the cartridge.

The object of the present invention is to provide an improved means for sealing cartridges of the kind described in which the disadvantage referred to is overcome in a simple and effective manner.

According to the present invention, in the manufacture of cartridges of the kind described, I provide an improved means for sealing the said cartridges comprising a rotary tool or chuck for effecting closure of the cartridge and a sleeve member adapted to embrace and support the wall of the cartridge for a substantial part of its length adjacent the end to be sealed, the said sleeve member being supported in alignment with the rotary tool or chuck and having no rotary movement relative to the cartridge during the closing operation.

Preferably the sleeve member is mounted as a component part of the chuck, means being provided to permit relative rotary movement as between the sleeve and the chuck, such means comprising for example, a ball or roller bearing or the like. Preferably also means are provided to advance the cartridge into the sleeve and chuck, and to facilitate withdrawal therefrom after the sealing operation.

One embodiment of my invention is illustrated in the accompanying drawing in which Fig. 1 is a sectional elevation of a chuck and sleeve members constructed in accordance with my invention.

Fig. 2 is a sectional elevation of a cartridge holding device.

Fig. 3 is an outside elevation of the chuck and holding device with a cartridge inserted in position.

Referring to the drawing, a chuck 1 for effecting the turnover of a cartridge 2 comprises a body part 3 which is provided with a screw-threaded aperture 4 and key-holes 5 to enable attachment of the chuck to a driving spindle 3a. A bore 6 and an annular groove 7 are formed in the chuck, and pins 8 are secured transversely in screw thread engagement with the chuck in such manner that the inner ends 9 of the pins intercept the groove 7. The said inner ends are shaped so that rotary movement of the cartridge forms a flange or beading thereon. A ball bearing 10 is housed within the enlarged end 11 of the chuck, the outer ring 12 of the bearing being a push fit in the chuck. A sleeve 13 is housed within the inner ring 14 of the bearing, and is a push fit therein. A flange or rim 15 on the said sleeve locates it in correct axial relationship in the chuck so that the said sleeve approaches closely to the mouth of the bore 6. The inner diameter of the sleeve and the diameter of the bore 6 are substantially the same as the overall diameter of the cartridge which is to be sealed.

Referring particularly to Figs. 2 and 3 of the drawing, a cup-shaped member 16 is adapted to receive the head of the cartridge, the inner wall of the said member being slightly conical, so that axial pressure on the cartridge causes the head thereof to be held firmly in the said member. The cup shaped member is secured in screw thread engagement with a push rod 17, and the said rod is slidably supported in guides (not shown), in axial alignment with the sleeve member and bore of the chuck so that the cartridge held by the cup-member may be advanced towards or retracted from the chuck. Means for retaining the cartridge head in the cup member when the said cartridge is being withdrawn from the sleeve comprises a ratchet 18, housed in a slot in the wall of the cup member. The said ratchet pivots on a pin 19 in a supporting member 20 secured to the wall of the cup member and is spring loaded by means of a spring 21 housed in a cavity 22 in the supporting member. Transverse movement of the ratchet is limited by a pin 23 which passes through a slot 24 in the ratchet and is anchored to the wall of the cup member. A projection 25 on the ratchet engages the rim of the cartridge head and enables the cartridge to be withdrawn from the sleeve and chuck. In order to release the cartridge from the cup-member the said member is provided with a false-base 26 to which is secured a pin 27, the said pin passing through an aperture 28 in the true base 29, of the cup member at a position opposite to the ratchet. A cushion 30, which may be of cork or like resilient material is inserted between the false and true bases of the cup member. On tapping sharply the pin 27, the false base is driven forward within the cup, and releases the cartridge head. The release may be made automatically by withdrawing the cup member until the pin 27 strikes the guide for the push-rod.

The extent to which the cartridge is supported by the sleeve member is shown in Fig. 3. The length of the sleeve member should be at least long enough to support the whole of that portion of the cartridge in which is accommodated the shot charge, other than that part of the cartridge which protrudes through the sleeve into the bore of the chuck itself. The sleeve therefore forms a rigid enclosure which operates to prevent distortion or deformation of the cartridge wall during the sealing operation.

Although I have illustrated and described one embodiment of my invention by way of example, the scope of the invention is not limited to the construction illustrated, and several methods may be adopted to carry the invention into effect. For example, the sleeve member may be mounted in axial alignment directly in front of the chuck, but independently thereof. Alternatively the sleeve may be mounted as a part of the feed mechanism, which feeds the cartridges to the chuck.

What is claimed is:

1. Apparatus for the closing of a shot shell comprising means for non-rotatably supporting said shot shell, a rotating closure forming die, and means supported by and rotatable relative to said closure forming die and to a shot shell held in said first mentioned supporting means for laterally supporting a portion of the body of said shot shell during the operation of said closure forming die.

2. Apparatus for the closing of a shot shell comprising means for non-rotatably supporting said shot shell; a rotating closure forming die; a skirt depending from said die; means supported by and rotatable relative to said closure forming die for laterally supporting a portion of said shot shell during the operation of said closure forming die; and a bearing between said skirt and last mentioned means.

3. Apparatus for the closing of a shot shell comprising means for non-rotatably supporting said shot shell; a rotating closure forming die; a skirt depending from said die; shell body supporting means rotatable relative to said closure forming die, said body supporting means being substantially fixed axially relative to the closure die and extending to support the shot charge portion of the shell body; and a ball bearing between said skirt and said body supporting means.

CHARLES STANLEY ROSSON.